(12) United States Patent
Hipp

(10) Patent No.: US 7,791,713 B2
(45) Date of Patent: Sep. 7, 2010

(54) DISTANCE MEASUREMENT

(75) Inventor: Johann Hipp, Hamburg (DE)

(73) Assignee: Triple-IN Holding AG, Zug (CH)

( * ) Notice: Subject to any disclaimer, the term of this patent is extended or adjusted under 35 U.S.C. 154(b) by 0 days.

(21) Appl. No.: 10/574,632

(22) PCT Filed: Oct. 5, 2004

(86) PCT No.: PCT/EP2004/011111

§ 371 (c)(1),
(2), (4) Date: Apr. 5, 2006

(87) PCT Pub. No.: WO2005/036203

PCT Pub. Date: Apr. 21, 2005

(65) Prior Publication Data

US 2007/0091294 A1    Apr. 26, 2007

(30) Foreign Application Priority Data

Oct. 6, 2003 (EP) .................................. 03022401

(51) Int. Cl.
*G01C 3/08* (2006.01)
(52) U.S. Cl. ..................................... 356/5.01; 356/5.03
(58) Field of Classification Search ........ 356/5.01–5.15
See application file for complete search history.

(56) References Cited

U.S. PATENT DOCUMENTS

| 4,299,484 A | 11/1981 | Holzapfel |
| 4,586,043 A | 4/1986 | Wolf |
| 6,950,177 B2 * | 9/2005 | Lewis et al. ................. 356/5.01 |
| 2001/0012104 A1 * | 8/2001 | Dunne .......................... 356/5.1 |
| 2002/0145725 A1 * | 10/2002 | Ogawa et al. ............... 356/5.01 |
| 2003/0035097 A1 * | 2/2003 | Lai et al. ..................... 356/5.01 |
| 2004/0135992 A1 * | 7/2004 | Munro ....................... 356/4.01 |

FOREIGN PATENT DOCUMENTS

| CN | 01109448.6 | 10/2002 |
| DE | 19637010 | 5/1997 |
| DE | 19703633 | 8/1998 |
| DE | 10010212 | 9/2001 |

* cited by examiner

*Primary Examiner*—Thomas H Tarcza
*Assistant Examiner*—Timothy A Brainard
(74) *Attorney, Agent, or Firm*—Gifford, Krass, Sprinkle, Anderson & Citkowski, P.C.

(57) ABSTRACT

The invention relates to a method for measuring distance wherein pulsed electromagnetic radiation is emitted by at least one transmitter and the reflected signal impulses are detected by at least one receiver. According to the invention, the distances of the objects, at which the emitted radiation impulses are reflected, is measured by determining the propagation time of the impulses. The noise is measured by a receiver and moments in time during which a noise threshold of the receiver is exceeded, are determined, and modifications of the noise produced by the signal impulses are detected by the communicating of a plurality of individual measurements respectively comprising said moments in time.

26 Claims, 5 Drawing Sheets

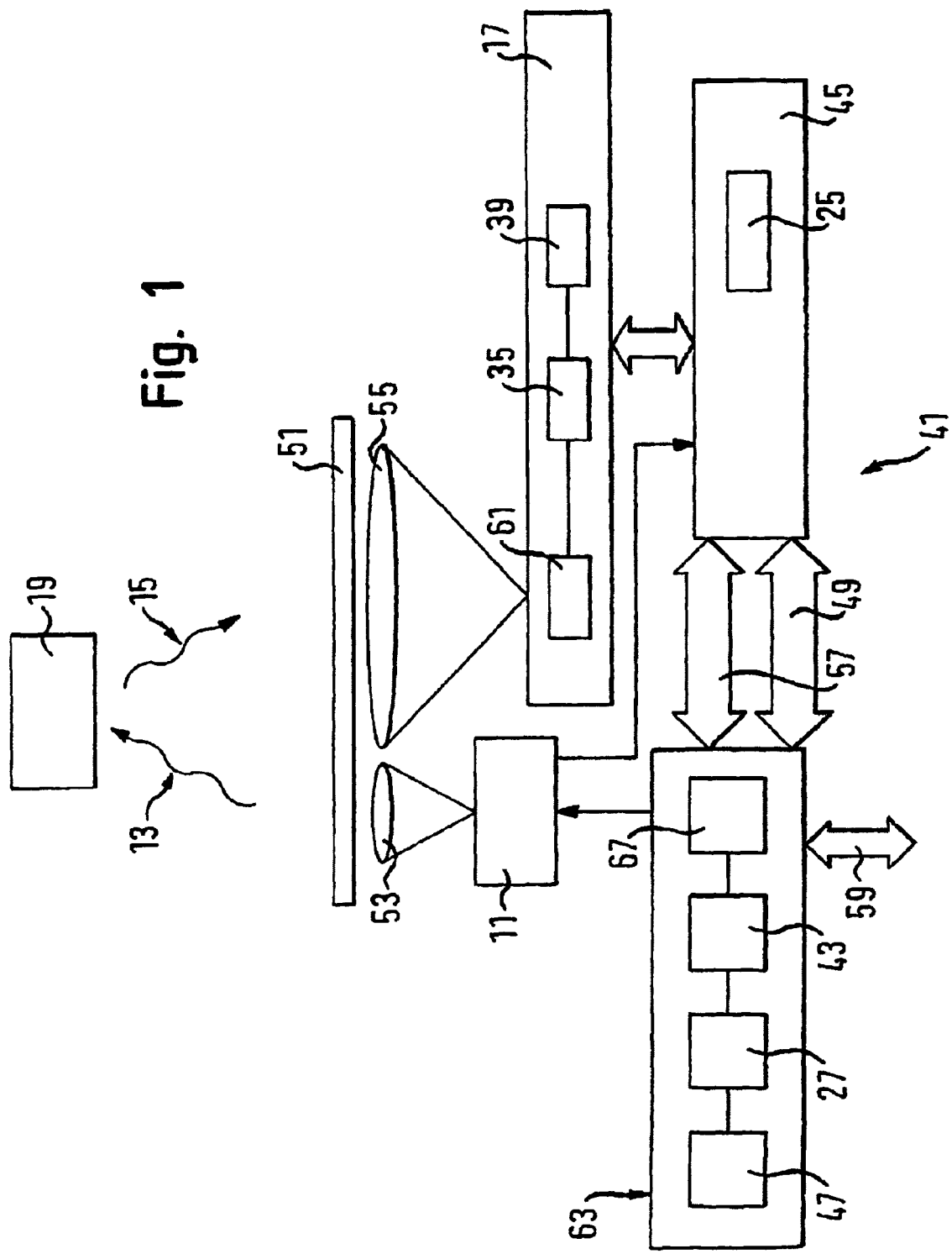

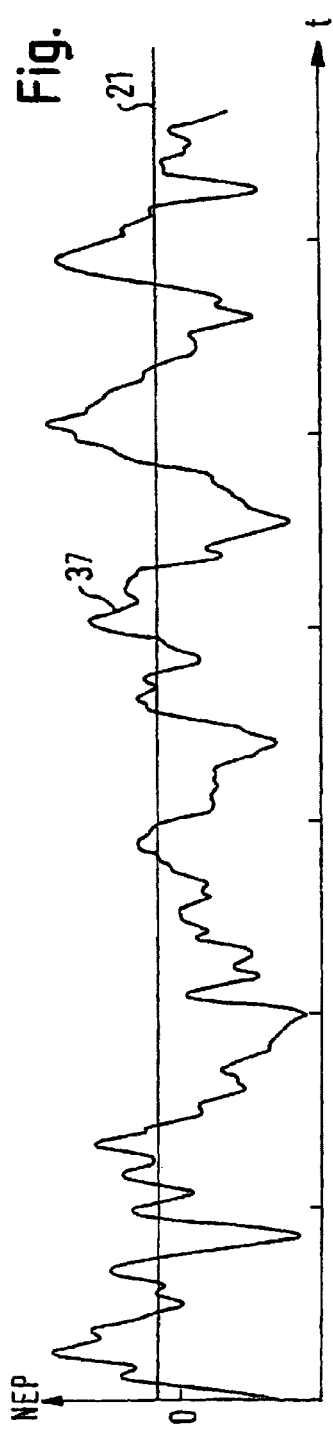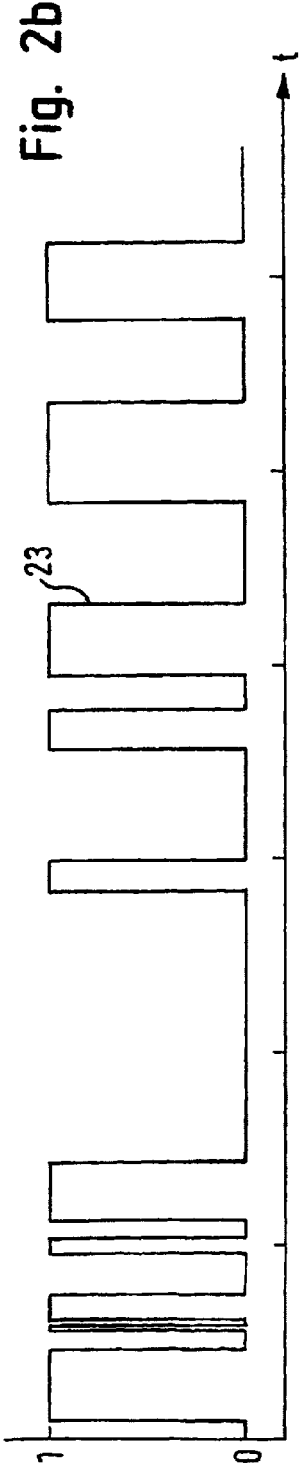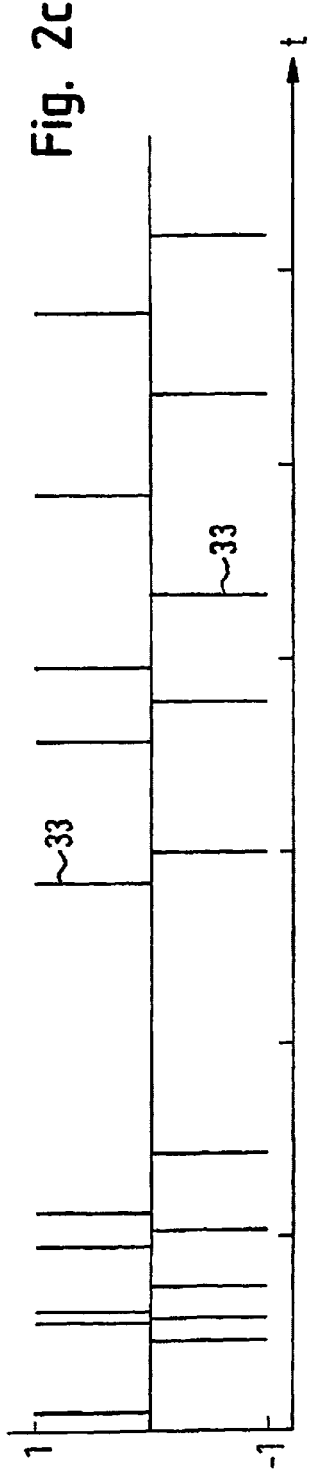

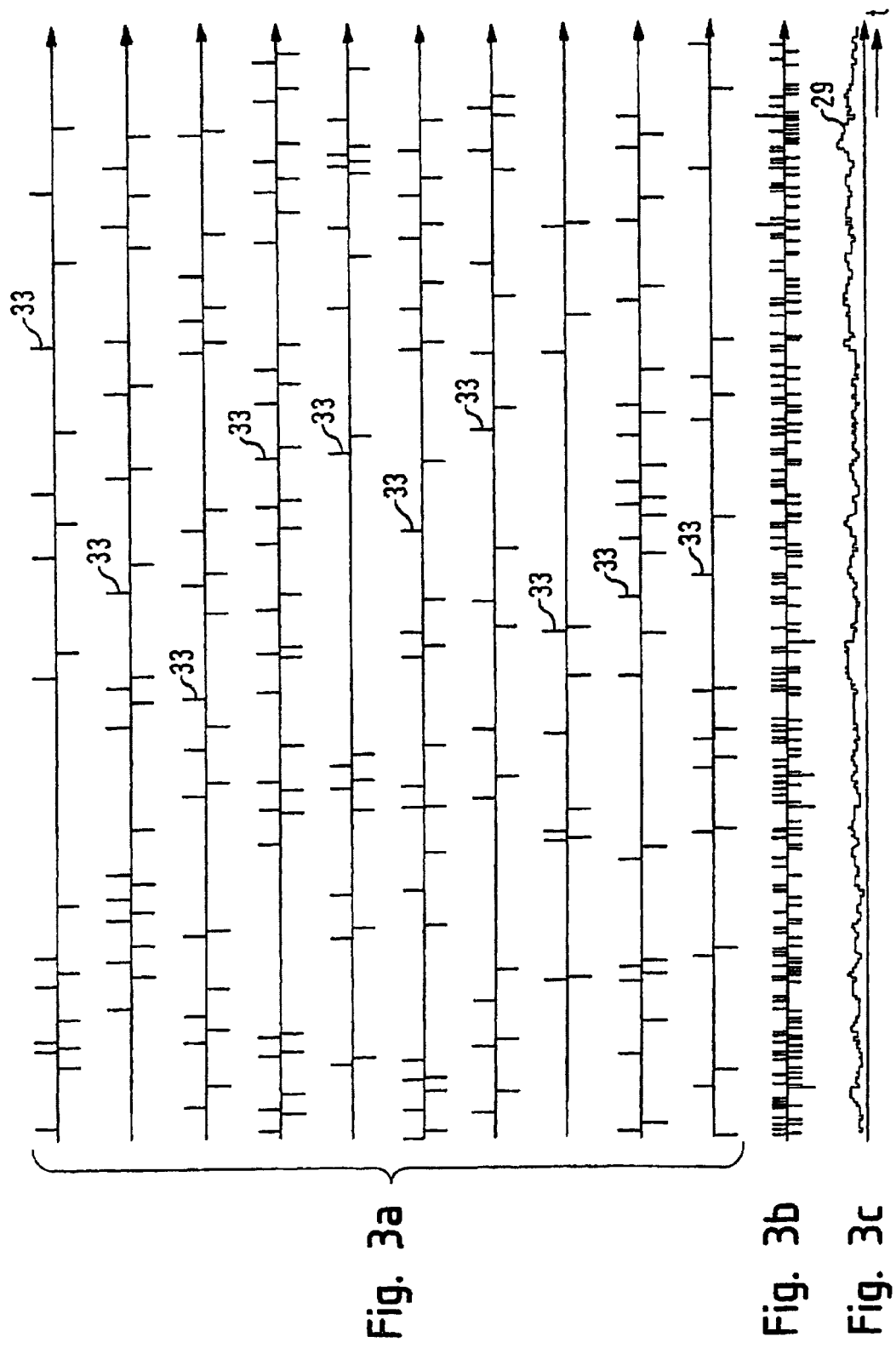

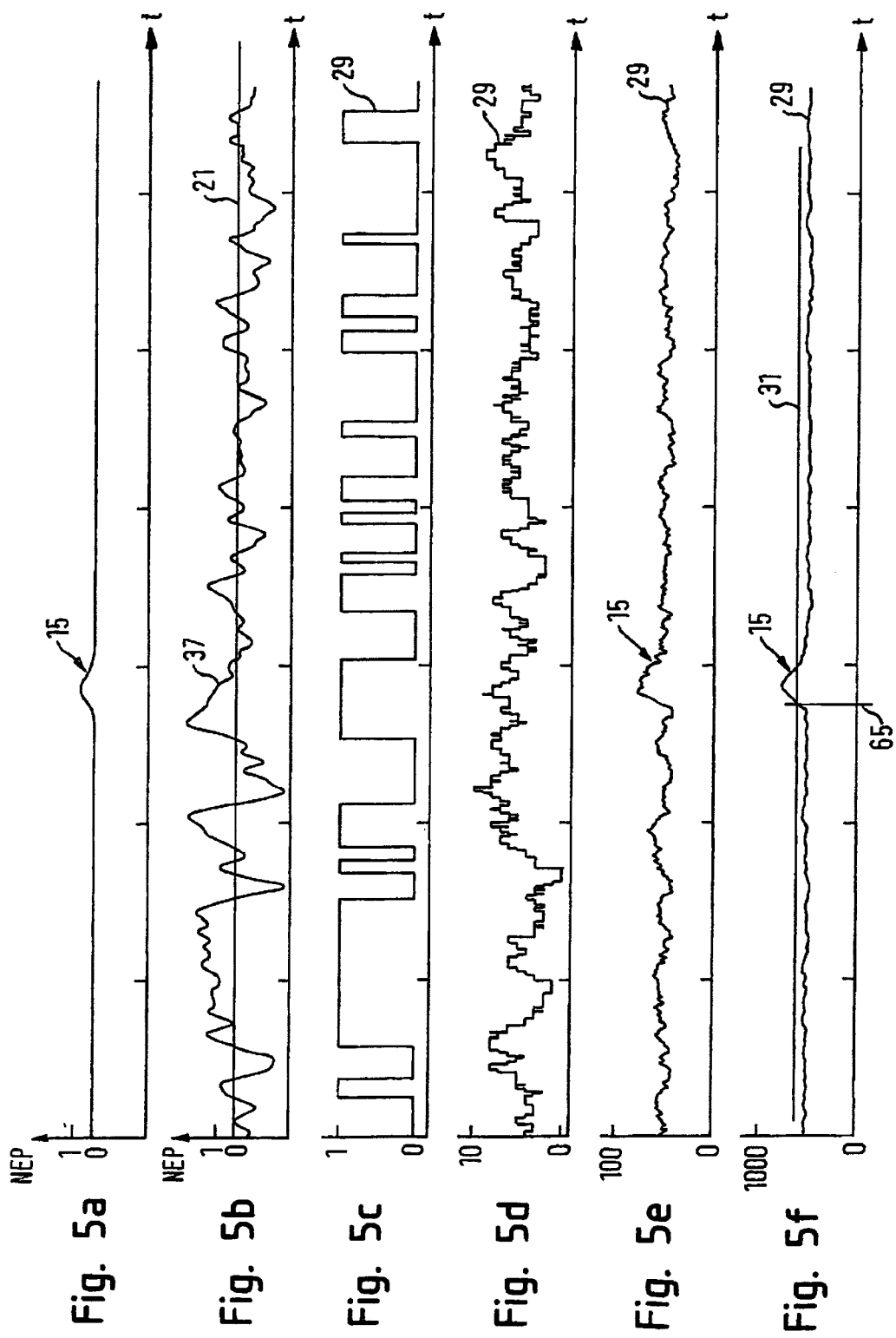

DISTANCE MEASUREMENT

CROSS-REFERENCE TO RELATED APPLICATIONS

This application is a National Stage of International Application No. PCT/EP2004/011111, filed Oct. 5, 2004, and which claims priority to European Patent Application No. 03022401.8, filed Oct. 6, 2003. The disclosures of these applications are incorporated herein by reference.

FIELD OF THE INVENTION

The invention relates to a method of distance measurement, wherein pulsed electromagnetic radiation is transmitted using at least one transmitter and reflected signal pulses are detected using at least one receiver, wherein the distances from objects at which the transmitted radiation pulses are reflected are measured by determining the pulse propagation time.

The invention furthermore relates to an apparatus for distance measurement by determining the pulse propagation time having at least one transmitter for the transmission of pulsed electromagnetic radiation and having at least one receiver for the detection of reflected signal pulses.

BACKGROUND OF THE INVENTION

Methods and apparatus of this type for distance measurement are generally known.

In the distance measurement, distance values should be obtained which are as precise as possible, on the one hand. On the other hand, a sensitivity of the measurement arrangement is aimed for which is as high as possible in order also to be able to detect signals with a comparatively low amplitude which originate, for example, from objects far away or from objects with a low reflectivity.

Known methods of distance measurement by determination of the pulse propagation time can be distinguished from one another with respect to the basic approach underlying them, with substantially two different approaches being used for the time measurement.

One approach is termed the "continuous measurement". In continuous measurement, the total analog received signal is scanned, i.e. the received signal is measured "continuously" with a precision corresponding to the scan rate used. It is customary to carry out a plurality of measurements and to form an average value over the measurements carried out at a high fixed scan rate for every measuring position, i.e. at every scan position in the received signal, in order to improve the signal noise ratio also called S/N in this manner. The signal pulses actually of interest can be restored from the quasi-continuous amplitude resulting from this, i.e. they can be separated from the noise, in order to thus be able to carry out the time measurement required for the distance measurement with reference to the restored signal pulses.

The high precision which can be achieved with it and the high sensitivity are of advantage in the continuous measurement. The substantial technical problems which have to be solved with respect to the required effort for scanning, storing and computing are disadvantageous. The reason for these problems is the huge amount of data which has to be dealt with in the scanning of the total received signal and in the subsequent evaluation.

An alternative approach in the time measurement is the so-called "event measurement" in which it is not the whole analog received signal which is evaluated, but rather the received signal is led over a comparator which ensures that only signal portions or points in time exceeding a set comparator threshold are detected and evaluated. In contrast to the continuous measurement, a flood of data is consequently avoided from the start in the event measurement in that measured values are only recorded for the events actually of interest, in particular for the signal pulses lying above the comparator reference.

An advantage of the event measurement consists of a high precision being able to be achieved by averaging a plurality of measurements, while only a very small amount of data has to be coped with. It is a disadvantage that the event measurement naturally does not allow any improvement in the sensitivity since the sensitivity is fixed by the position of the comparator threshold which requires a specific spacing of the signal pulses of interest from the noise and which has to be set in accordance with this signal/noise spacing. A further disadvantage of the event measurement consists of the fact that only one single signal pulse, also known as an echo, can be evaluated per transmitted radiation pulse without an expensive and/or complex expansion of the evaluation electronics, since the transmitted radiation pulse starts the time measurement and the echo, i.e. the signal pulse detected at the receiver, stops the time measurement.

No measurement method is currently known in the field of distance measurement by pulse propagation time measurement which simultaneously delivers a high precision and a high sensitivity on the basis of a justifiable amount of data.

SUMMARY OF THE INVENTION

It is the object of the invention to provide the possibility in distance measurement by determining the pulse propagation time of realizing a high precision of the distance measurement with a simultaneously high sensitivity, with in particular the evaluation of a plurality of signal pulses per transmitted radiation pulse being possible, i.e. a multi-echo capability being given, and with it also being possible to be able to analyze the shape of the signal pulses, that is to be able to process reflection signals of any shape.

This object is satisfied in accordance with the invention by the features of the independent method claim 1 and by the features of the independent apparatus claim 23.

Provision is accordingly made in the method in accordance with the invention for the noise to be measured using the receiver, with points in time being determined at which at least one threshold of the receiver lying in the noise is passed through and with changes in the noise caused by the signal pulses being detected by averaging a plurality of individual measurements respectively including the specific points in time.

In contrast to the event measurement initially explained, in accordance with the invention, the noise is consequently measured directly and not only a signal projecting far above the noise. In contrast to the continuous measurement likewise initially explained, however, it is not the whole analog received signal which is continuously scanned in accordance with the invention, but specific characteristic positions ("events") of the received signal are selected with the points in time at which the threshold of the receiver lying in the noise is passed through. Only these selected positions of the received signal are subjected to a further evaluation.

This further evaluation comprises, in accordance with the invention, an averaging of a plurality of individual measurements, with these individual measurements, however, in contrast to the continuous measurement, not containing a huge number of measured points of the analog received signal determined by the scan rate in the invention, but actually only containing the characteristic points in time. The individual measurements subjected to the averaging therefore do not each represent the total received signal, but rather only form a portion of the analog received signal with the specific points in time which are admittedly small, but are characteristic and clearly defined.

A dramatic reduction in the amount of data is hereby achieved with the invention, but without dispensing with information present in the analog received signal, as is the case with the event measurement. Since the threshold of the receiver lies in the noise in accordance with the invention, the total received signal is taken into account in the evaluation and not just a signal which projects sufficiently far above the noise.

Only the amplitude of the noise pulses remains out of consideration due to the restriction in accordance with the invention to the characteristics points in time in the received signal of the receiver. However, this does not represent a problem since, in those, time ranges in which only noise is present, but no signal, the noise pulses are so-to-say "averaged out" in the averaging in accordance with the invention. The circumstance is therefore utilized in these time ranges that the noise pulses are statistically distributed, i.e. positive and negative noise pulses have a fixed probability ratio dependent on the position of the threshold of the receiver, e.g. are equally probable in the case of a receiver threshold lying at 0 NEP. "NEP" ("noise equivalent power") here designates that power which corresponds to the effective value of the noise.

In those time ranges, in contrast, in which a signal is present, the circumstance is utilized in accordance with the invention that the noise is influenced by the signal, i.e. the noise pulses are changed by the superimposition with the signal. This circumstance means that, in the range of a signal, the noise curve is shifted into the positive due to the signal, which results in a widening of the noise pulses and thus increases the probability that the threshold of the receiver is exceeded, that is that the presence of a positive signal can be detected.

This probability increase or asymmetry makes itself noticeable in the averaging in accordance with the invention in that, in the ranges of pure noise, the noise pulses are brought to an average value, whereas, in those ranges in which a signal is present, the probability increase caused by this signal can be measured as a higher value, that is as a value which lies above the average value of the noise. The noise therefore reduces in the averaging in accordance with the invention, whereas the level of the signal remains unchanged.

This circumstance utilized by the invention is independent of the shape of the signal in particular determined by the quality of the object reflecting the transmitted radiation pulses. Both individual signal pulses with a short duration with respect to the measurement time, on the one hand, and continuous signals with an amplitude extending over their duration by any amount and differing from zero, on the other hand, shift the noise curve into the positive and can thus be detected by means of the method in accordance with the invention. Whereas this only takes place "locally" with a short signal pulse, a wider signal shifts the noise curve in the respective time range as a whole. A wide signal of this type is also to be understood in the sense of the invention as a "signal pulse" and a shift of the noise curve as a whole of this type is to be understood as a "change in the noise".

It is of particular advantage in the invention that what has been explained above additionally applies to signals of any desired magnitude and in particular also to those signals which lie in the noise, i.e. whose amplitude is smaller, and in particular substantially smaller, than the average amplitude of the noise pulses. Small signals of this type cannot be detected using the event measurement initially explained. Large signals admittedly also superimpose themselves on the noise. However, this circumstance practically does not play any role in the event measurement, since here anyway only those signals are detected which lie considerably above the noise, i.e. the noise is not measured here.

A further great advantage of the invention is that a multi-echo capability is more or less automatically given since the total analog received signal is taken into account.

Since, in accordance with the invention, the averaging of the individual measurements is only carried out on the basis of the comparatively few characteristic points in time, the invention permits a dramatic increase in sensitivity, without a correspondingly large effort for measurement and evaluation simultaneously being required. Tests starting from a practically realizable configuration of a distance measurement apparatus have shown that approximately 60 noise pulses per 100 m range are to be expected with a receiver threshold lying at the center of the noise.

The increase in sensitivity in accordance with the invention opens up an abundance of new sensor designs and applications for distance measurement which were previously not possible and which will be looked at in more detail at another point.

This foray into previously unattained regions is therefore achieved—expressed in graphic terms—in that the invention internalizes the advantages of a complete utilization of information by taking account of the total analog received signal—as with the continuous measurement in this respect—and the advantages of a data reduction by restriction to characteristic events—as with the event measurement in this respect. This takes place in accordance with the invention in that the analog received signal is admittedly evaluated continuously, on the one hand, but only with respect to the events represented by the specific points in time, on the other hand.

For this reason, the invention is also called a "continuous event measurement", abbreviated as CEM.

Advantageous embodiments of the invention are recited in the dependent claims, in the description and in the drawings.

In accordance with the invention, an individual measurement can be generated for each transmitted radiation pulse. Sufficient time is available in each case between the transmission of two sequential radiation pulses even at high pulse frequencies to be able to process the individual measurement resulting from the earlier radiation pulse due to the restriction in accordance with the invention to the characteristic points in time.

The position of the threshold of the receiver can be adapted to the respective application. The further the threshold of the receiver is placed into the noise, i.e. the lower the threshold is set, the smaller the signals which can still be detected. At the same time, however, the averaging effort increases which has to be carried out to separate the small signals from the noise, since the threshold of the receiver is passed through by the flanks of the noise pulse the more frequently, i.e. the individual measurements comprise a number of points in time which is the larger, the lower the threshold of the receiver is set. The gain in sensitivity therefore takes place at the price of a higher averaging effort, with this averaging effort, however, in accordance with the invention, still lying under that of the continuous measurement initially explained by orders of magnitude since, even in the case of a threshold of the receiver lying at 0 NEP, only the specific characteristic points in time are still used in accordance with the invention.

The threshold of the receiver can be set differently in dependence on the respective application, in particular in dependence on the averaging effort and/or on the detection sensitivity. The number of noise pulses per time unit can serve as the measure for a change in the receiver threshold to be carried out, for example, while therefore taking account of the speed of light per unit of length. This measure can be derived from the measured values, e.g. from the density of the specific points in time in the individual measurements.

The generation and the averaging of the individual measurements and also the detection of the changes in the noise preferably take place by means of a software-aided evaluation method.

Provision is furthermore preferably made for a sequence of logical pulses to be generated by means of the threshold of the receiver lying in the noise from the analog received signal containing noise pulses and/or noise pulses changed by the signal pulses, with the individual measurement being derived from this sequence. This sequence of logical pulses is also termed a logical measurement. The logical measurement only contains information on the points in time at which the threshold of the receiver was passed through by the received signal also termed the analog measurement.

A dramatic reduction in data is hereby achieved, with the important data containing information on the signal being searched for, however, actually not being lost since the change in the noise caused by the signal has a direct effect on the position of the points in time of the passing through due to the widening of the noise pulses taking place in the time range of the signal. Consequently, only what is not needed is left out of consideration in this skilful data reduction.

It is preferably the flanks of the logical pulses which are used as the points in time of the individual measurement in accordance with the invention.

It is furthermore proposed in accordance with the invention that the points in time of the individual measurement are written to at least one memory of the receiver. That memory to which each individual measurement is provisionally written directly after its generation is preferably an element of an IC component.

The points in time of the individual measurement are preferably first intermediately stored in a memory, in particular in a memory of an IC component, and subsequently transferred to a further memory, in particular to a time pattern memory, with the points in time being stored in the further memory in an arrangement taking their respective time information into account. The points in time are preferably represented in the one memory by numbers which in particular correspond to counter states of a counter counting the cycles of a clock during the measurement and in the other memory by memory addresses, with a clear association existing between the numbers and the memory addresses.

It is furthermore preferred for the averaging of the individual measurements to be carried out in at least one time pattern memory, with the same time pattern memory preferably being used for all individual measurements to be averaged and with the corresponding memory cell of the time pattern memory being increased by a value n in the case of a rising pulse flank or being reduced by the value n in the face of a falling flank, or vice versa, with the value 1 preferably being used for n.

That time pattern memory in which the averaging of the individual measurements takes place is preferably not identical to that memory in which the individual measurements are respectively first introduced, but rather an element of a processor system which is connected to an IC component comprising the first memory via a parallel interface.

A time pattern is preferably used in the averaging of the individual measurements in which the measurement time is divided into a plurality of sequential time windows. In this process, a memory cell is preferably associated with each time window for each of the time pattern memories used so that the measurement time divided into sequential time windows or the characteristic points in time determined during the measurement time can be mapped in the time pattern memories.

The averaging of the individual measurements can therefore take place in that the number of passing throughs of the threshold of the receiver is in particular counted or averaged with the correct sign inside the same time pattern memory for each time window in that the value of the respective memory cell is respectively changed accordingly.

After the last individual measurement to be averaged has been taken into account, the number of the determined passing throughs of the receiver threshold for each time window can be divided by the number of the averaged individual measurements also known as the averaging depth, with the averaging of the individual measurements being ended with this. It is alternatively possible to increase or reduce the corresponding memory cell of the time pattern memory by the value "1/averaging depth" for each time window on each passing through of the receiver threshold occurring in this time window, i.e. to carry out the division by the number of the averaged individual measurements before the time pattern memory is written.

Provision is furthermore preferably made in accordance with the invention for the average value to be integrated into an amplitude function subsequently to the averaging of the individual measurements. The amplitude function will also be termed the software amplitude or SW amplitude in the following. Whereas the individual measurements each represent the time derivation of the logical measurement obtained from the analog measurement via the passing through positions of the receiver threshold and the averaging of the individual measurements thus takes place so-to-say in the "differentiated world", i.e. derivations of the logical amplitudes are formed after the time in order to achieve a dramatic saving in effort for computing, memory and evaluation by the data reduction achieved with it, the subsequent integration of the result of the averaging of the individual measurements so-to-say represents the return into the "real world", i.e. amplitudes as a function of the time are again present. In this process, however, the noise was reduced by the averaging of the individual measurements by a specific amount with respect to the signal, in particular by an amount determined by the averaging depth, i.e. by the number of averaged individual measurements.

Since a complete "averaging out" of the pure noise could only be achieved by averaging an infinitely large number of individual measurements, the amplitude function is also not precisely smooth in the time ranges of pure noise. In accordance with a preferred further development of the invention, the sensitivity can, however, be further increased in that the bandwidth of the amplitude function is reduced in that e.g. averaging is carried out in the amplitude function in each case over a predetermined number of sequential time windows. A measure of this type, also known as horizontal averaging, results in a smoothing of the amplitude function, whereby in particular noise as a result of quantization is reduced.

To detect the changes in the noise caused by the signals, a detection threshold is preferably applied to the amplitude function. Since the method in accordance with the invention preferably takes place at the latest starting from the averaging of the individual measurements within the framework of a software-aided evaluation, i.e. all operations take place by way of software, the detection threshold applied to the amplitude function is also termed a software threshold or, in abbreviated form, SW threshold.

By the reduction of the noise based on the averaging carried out using the individual measurements, those signal pulses also project in the amplitude function which were "lost in the noise" in the analog measurement and only resulted in a change in the noise from that noise reduced by the averaging which can also be termed software noise.

The signal pulses projecting from the (software) noise can now be identified in a simple manner by means of the SW threshold. Expressed in graphic terms—in the style of the event measurement initially explained—an "event measurement" of this type is therefore carried out so-to-say in the amplitude function for the identification of the sought signals, with this taking place, however, by way of software, on the one hand, and not at the analog output signal of an amplifier, on the other hand, but at a purely abstract structure—namely the amplitude function—which was gained from discretely distributed points in time of the original analog signal.

The respective associated object distance is preferably determined in the amplitude function for the signal pulses on the basis of at least one point in time at which the detection threshold is passed through. This point in time is in particular the point in time at which the front or rising flank of the signal pulse passes through the detection threshold.

Since the point in time determined by means of the detection threshold or SW threshold serves as the basis for the distance measurement and irregularities in the determination of this point of time have a direct effect on the object distance calculated from it, in accordance with a preferred further development of the invention, the accuracy can be increased when an extrapolation of the noise is carried out in the amplitude function for the determination of nadirs of the signal pulses in each case in the region of the rising and/or falling flank of the signal pulse, a noise function obtained in this process is deducted from the amplitude function and the point of intersection of the interpolated pulse flank with the zero line is determined as the nadir, with the object distances being determined on the basis of the nadirs. The "zero line" here means the local average value of the noise.

The flanks of the signal pulses are adjusted here in that the information available with the amplitude function or the SW amplitude is utilized. This measure, also termed noise compensation, utilizes the circumstance that the nadirs do not have any dependence, or have at least a lower dependence, on the amplitude of the signal pulses than the points of intersection of the signal pulse flanks with the detection threshold or SW threshold so that, on the one hand, a higher accuracy is achieved and, on the other hand, the influence of the generally unavoidable amplitude dependence is reduced.

It is furthermore proposed in accordance with the invention that the shape of the signal pulses is evaluated in the amplitude function. Further information in addition to the object distances can hereby be obtained on the objects at which the transmitted radiation pulses are reflected. The shape of the signal pulses is in particular influenced by the shape, by the extent, by the structure and by the surface quality of the reflecting objects so that conclusions can be made on the type of the object from the shape of the signal pulses.

It is of particular advantage in accordance with the invention that the signal pulses in the amplitude function are present by way of software, whereby an analysis of the signal pulses with respect to their pulse shape is possible at all in the first place, on the one hand, and the most varied evaluation procedures can be used for the determination of the pulse shape in a simple manner, on the other hand.

The averaging of the individual measurements preferably takes place packet-wise in that a respective number of individual measurements are summed and divided by the number of individual measurements for the formation of packet averages. It is expressed by the term "packet" here that a plurality of individual measurements are used for the determination of the object distances, i.e. to obtain a single value for an object distance, a plurality of individual measurements termed packets are used.

The object distances can each be determined from a single packet average value. It is alternatively possible to average over a plurality of packets and to determine the object distances from the average value hereby formed. Since a larger number of individual measurements are taken into account in this further averaging, the sensitivity and accuracy of the distance measurement can hereby be further improved. A further advantage of the averaging of a plurality of packets consists of being able to use specific averaging processes, and indeed in particular those which cannot be used in the averaging of the individual measurements carried out for the packet formation or which should not be used, e.g. due to too high a requirement of computing time.

Provision is made with the apparatus in accordance with the invention also simply termed a sensor in the following for the receiver to comprise an amplifier for the generation of an analog received signal and a device having at least one threshold lying in the noise with which a series of logical pulses can be generated from the analog received signal and for an evaluation device to be associated with the receiver with which a respective individual measurement can be generated for a plurality of transmitted radiation pulses from points in time which correspond to the flanks of the logical pulses and an averaging of the individual measurements respectively including the specific points in time can be carried out for the detection of changes in the noise which are caused by the signal pulses.

The receiver preferably comprises an element which is made for the detection of electromagnetic radiation and which is in particular provided in the form of a photodiode, preferably a photodiode of the APD type. The transmitter preferably comprises a laser diode for the transmission of the radiation pulses.

The device having the at least one threshold lying in the noise preferably comprises at least one comparator having a reference forming the threshold, with a limiting amplifier, however, also generally being able to be provided for the generation of the logical pulses from the analog received signal instead of a comparator.

A clock for the outputting of cycle pulses of a known width with a known frequency and a counter with which the cycle pulses output during a time period are preferably provided for the determination of time periods which respectively pass from the transmission of a radiation pulse up to a point in time corresponding to a flank of a logical pulse. The time base of the distance measurement device in accordance with the invention can be fixed by a central "measurement clock" of this type.

The measurement time is preferably divided into a plurality of sequential time windows, with the evaluation device comprising at least one time pattern memory whose memory cells are each associated with a time window.

Provision is preferably made in this process for the value of each memory cell to be changeable by a pulse flank falling in the corresponding time window, with each memory cell preferably being able to be increased by a rising pulse flank by a value n and being able to be reduced by a falling flank by the value n, or vice versa, with the value 1 preferably being provided for n.

The generation and the averaging of the individual measurements and also the detection of the changes in the noise can preferably be carried out by means of a software-aided evaluation process.

The evaluation device preferably comprises at least one IC component in which at least the generation of the individual measurements can be carried out.

Provision is furthermore preferably made for the evaluation unit to comprise at least one processor and at least one interface for the transmission of the generated individual measurements from the IC component into the processor, with at least the averaging of the individual measurements and the detection of the changes in the noise being able to be carried out by means of the processor and of at least one memory.

The distance measurement device in accordance with the invention can have one or more measurement channels. In the case of a multi-channel variant, a receiver diode with an associated amplifier and comparator is preferably provided for each channel.

A particular advantage of the invention consists of no basic changes or extensions having to be made to the general basic structure of conventional sensors for the realization of a sensor suitable for the carrying out of the method in accordance with the invention. The invention can generally be realized with conventional components, with it being preferred, however, to provide a specifically made IC component with which at least the generation of the individual measurements can be carried out.

The dramatic increase in sensitivity only made possible by the invention in particular makes it possible to realize sensors which have a substantially simpler structure in comparison with conventional sensors, which have smaller dimensions and/or can be manufactured more cost favorably, without having to accept even only slight compromises in performance, in particular in the sensitivity, and having to accept at most low compromises in the accuracy.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 schematically illustrates the design of an apparatus for distance measurement in accordance with an embodiment of the invention;

FIGS. 2a-2c illustrate, for the example of a measurement without a signal, the analog measurement itself (FIG. 2a), the logical measurement derived from it (FIG. 2b) and the individual measurement derived from it (FIG. 2c);

FIGS. 3a-3c illustrate, for the example of ten individual measurements without a signal, the ten individual measurements themselves (FIG. 3a), the averaging of these ten individual measurements (FIG. 3b) and the software amplitude derived by integration from the averaging (FIG. 3c);

FIGS. 5a-5f illustrate, for the example of a measurement with a signal, the signal itself without noise (FIG. 5a), an analog measurement containing the noise and the signal (FIG. 5b), the software amplitude for a single individual measurement (FIG. 5c), the software amplitude determined by averaging and integration of 10 individual measurements (FIG. 5d), the software amplitude determined by averaging and integration of 100 individual measurements (FIG. 5e) and the software amplitude determined by averaging and integration of 1,000 individual measurements (FIG. 5f).

DETAILED DESCRIPTION OF THE PREFERRED EMBODIMENTS

Figure 4A:
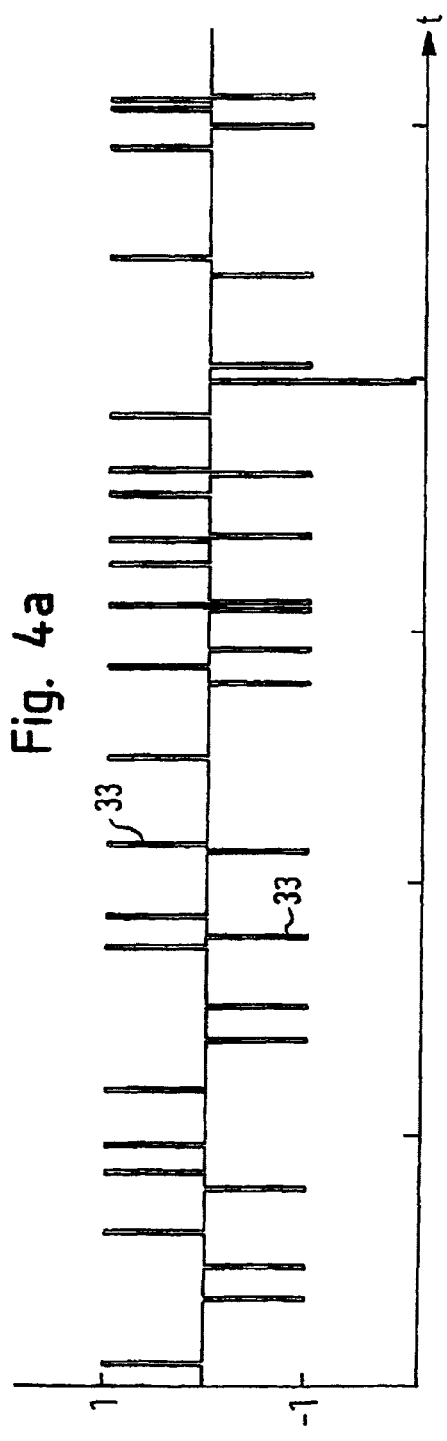
FIGS. 4a-4b illustrate, by way of example, the integration of an averaging of a plurality of individual measurements (FIG. 4a) to the software amplitude (FIG. 4b) in a scale increased with respect to FIG. 3.

The following description of the preferred embodiment(s) is merely exemplary in nature and is in no way intended to limit the invention, its application, or uses.

The principle of the method in accordance with the invention should first be explained with reference to FIGS. 1-5 before a closer look is taken at details of a distance measuring device with which the method in accordance with the invention can be carried out and at practical applications which are made possible by the invention. The representations of FIGS. 2-5 were obtained by simulation calculations.

FIG. 1 schematically shows an apparatus in accordance with the invention for distance measurement (sensor) which is made for the carrying out of the distance measurement method in accordance with the invention.

The sensor comprises a transmitter 11 with a laser diode (not shown) for the transmission of pulsed electromagnetic radiation 13. Signal pulses 15 reflected from objects 19 disposed inside the range of the sensor are incident on a receiver diode 61 of a receiver 17 of the sensor, i.e. the transmitted beam covers the field of view defined by the receiver diode 61.

An optical transmitter device 53 associated with the transmitter 11 and an optical receiver device 55 associated with the receiver 17 are arranged behind a sensor cover 51 permeable for the radiation used.

An amplifier 35 and a comparator 39 are arranged after the receiver diode 61. The amplifier 35 delivers an analog received signal which is also termed an analog measurement in the following and which contains noise in addition to the signals or signal pulses received, which will be looked at in more detail in the following.

The reference of the comparator 39 also termed a hardware threshold or HW threshold in the following is set in dependence on the respective application, in particular in accordance with the desired sensitivity.

A sequence of logical pulses, which are supplied to a downstream IC component 45 of the sensor which is an element of a control and evaluation device 41 of the sensor, is generated by means of the HW threshold from the analog received signal of the amplifier 35. The IC component 45 comprises a memory 25 which will be looked at in more detail in the following. The memory 25 serves to store so-called individual measurements which consist of characteristic points in time of the analog measurement which are derived by means of the comparator 39 from the analog measurement via the logical pulses.

The object distance to be determined by means of the sensor is obtained by averaging a plurality of individual measurements of this type. For this purpose, a processor system 63 to which the individual measurements contained in the memory 25 of the IC component 45 are respectively transmitted is arranged downstream of the IC component 45 via a parallel interface 49. A shift register multiplex is also provided between the IC component 45 and the processor system 63.

The processor system 63 comprises a microprocessor 47 for the control of all relevant operations of the sensor, a central measuring clock 43 serving as a time clock for the fixing of a time base for the propagation time measurement, a counter 67 for the counting of the time cycles of the measuring clock 43 and a memory system 27 in which the averaging of the individual measurements transmitted by the IC component 45 takes place and which comprises a plurality of time pattern memories which will likewise be looked at in more detail in the following.

The object distances determined with the processor system 63 can be determined via an interface 59.

The sensor in accordance with the invention can be designed as a multi-channel version so that a distance measurement is possible simultaneously in a plurality of parallel measuring channels. In this case, the receiver 17 comprises an array of receiver diodes 61 and of amplifiers 35 associated with them as well as comparators 39, whereas the IC component 45 contains a memory 25 for each measuring channel and the memory system 27 of the processor system 63 likewise has a number of identical memory arrangements corresponding to the number of measuring channels and working in parallel. In the event of a multi-channel sensor of this type, the transmitted beam 13 transmitted by the transmitter 11 is preferably shaped such that it covers the fields of view of all receiver channels, that is all receiver diodes 61.

Since the distance measurement takes place by averaging in accordance with the invention, unchanging conditions should apply during the measurement, i.e. the object should neither change nor move relative to the sensor during the measurement at least within a period of time which is sufficient to transmit so many radiation pulses in the direction of the object as are necessary for the averaging depth dependent on the respective circumstances. Preferred applications, but by no means exclusive applications of the invention consequently relate to standing or rigid sensors. Applications of this type are also termed one-dimensional applications since the sensor only "looks" in precisely one direction.

The following explanation of the measuring method in accordance with the invention, which can be carried out by means of the sensor in accordance with the invention described above, relates to processes in a single measuring channel. With a multi-channel sensor, these processes run simultaneously in the parallel measuring channels.

FIG. 2a shows the time behavior of the output signal 37 of an amplifier connected to a receiver diode when the receiver diode is not receiving any signal, i.e. is not being acted on by electromagnetic radiation of a signal of interest. FIG. 2a thus shows the always present noise which comprises statistically distributed noise pulses which lie above and below the zero line. In this process, the zero line corresponds to 0 NEP.

The output signal 37 of the amplifier is delivered to a comparator whose reference 21 termed a hardware threshold or HW threshold in the following is set to a value which lies inside the noise, as FIG. 2a shows. "Inside the noise" in particular means that the HW threshold 21 lies between −4.5 NEP and +4.5 NEP. The HW threshold 21 can e.g. lie at 0 NEP. At this setting, the detection sensitivity, on the one hand, but also the averaging depth and thus the computing time required for the detection of a signal for the averaging, on the other hand, is admittedly the largest possible. A setting of the HW threshold 21 to a value below 0 NEP is possible in accordance with the invention. It is furthermore possible to set the HW threshold 21 to a value far above +4.5 NEP, i.e. to place it far above the noise. In this manner, it is possible to work with the invention in accordance with the initially explained event measurement, i.e. the event measurement can in this respect be considered a special case of the method in accordance with the invention.

The fact that the HW threshold 21 lies in the noise in accordance with FIG. 2a means that the HW threshold 21 is passed through by the noise pulses several times.

Due to the finite gradient which the flanks of the noise pulses have and to the different amplitudes of the noise pulses, the points in time 33 (FIG. 2c) at which the HW threshold 21 is passed through depend on the position of the HW threshold 21, in more precise terms on the relative position between the HW threshold 21 and the analog measurement 37.

In accordance with the invention, a logical measurement is generated from the analog measurement 37 in accordance with FIG. 2a with the help of the HW threshold 21 of the comparator which consists of a sequence of logical pulses 23 of an equal level as is shown in FIG. 2b. The flanks of the logical pulses 23 lie at the points in time 33 (FIG. 2c) at which the flanks of the noise pulses of the analog measurement 37 have passed through the HW threshold 21, with a rising flank of a noise pulse corresponding to a rising flank of a logical pulse 23 as well as a falling flank of a noise pulse corresponding to a falling flank of a logical pulse 23

The fineness or time resolution of the method in accordance with the invention is therefore so high that not only the exceeding of the HW threshold 21 per se is detected and is delivered to the further evaluation by generation of a logical pulse 23, but also a lot more information contained in the analog measurement 37 is utilized in that it a distinction is made between an exceeding and a falling below of the HW threshold 21 by the analog measurement 37 or that it is detected at all when the HW threshold 21 is fallen below again after its exceeding, or vice versa. Logical pulses 23 are consequently obtained which have a different width, as FIG. 2b shows. The width of the logical pulses 23 or the "pauses" between the logical pulses 23 indicate how long the analog received signal 37 lies above or below the HW threshold 21.

Subsequently, a so-called individual measurement is generated from the logical pulses 23 of the logical measurement in accordance with FIG. 2b in that the points in time 33 of the rising and falling flanks of the logical pulses 23 are digitized and stored in a so-called event list. This event list represents the information contained in an individual measurement. In the following, the rising or positive flanks are also termed up events and the falling or negative flanks are also termed down events.

FIG. 2c is a graphical representation of the stored event list forming the individual measurement, with the upwardly facing lines also termed "needles" 33 in the following for purposes of illustration only representing the up events and the downwardly facing needles 33 representing the down events. In this respect, the individual measurement in accordance with FIG. 2c can be considered as the temporal derivation of the logical measurement formed by the logical pulses 23, i.e. as obtained by differentiation of the logical measurement.

The generation of the individual measurement, that is of the event list, in accordance with FIG. 2c takes place in an IC component which has a comparatively small memory, also simply termed an IC memory in the following, for the storage of the event list whose number of storage locations only lies in the order of magnitude of the noise pulses expected per individual measurement, i.e. corresponding in the order of magnitude to the expected sum of up events and down events. A storage location is filled with a number for each event which corresponds to the counter status of the counter counting the cycles of the central measurement clock (FIG. 1) during the measurement. The numbers stored in the memory of the IC component thus contain a piece of time information, namely a piece of information on the point in time of the occurrence of the respective up or down event with respect to the transmission of the radiation pulse starting the individual measurement. The total event list in accordance with FIG. 2c is consequently stored as a set of counter statuses in the memory of the IC component The memory is divided into two memory regions for the distinction between up events, on the one hand, and down events, on the other hand.

The content of the memory of the IC component representing the individual measurement therefore only contains the information when and in which direction the HW threshold 21 lying in the noise was passed through by the noise pulses of the analog measurement 37.

In accordance with the invention, the dramatic data reduction already mentioned several times is hereby achieved since, in the further course of the method for distance measurement, only the individual measurements are used which respectively admittedly contain few pieces of information, but particularly the decisive pieces of information.

The averaging of individual measurements and a subsequent integration of the result of the averaging into a software amplitude are illustrated in FIG. 3.

In accordance with the invention, the determination of the object distances takes place by averaging of a plurality of time-sequential individual measurements, with each individual measurement representing characteristic points in time 33 of what was received by the receiver diode after transmission of a radiation pulse. It is admittedly preferred in this process, but not compulsory, for the individual measurements to be averaged to be generated from the analog measurements of directly sequential transmitted radiation pulses.

The averaging of the individual measurements no longer takes place in the IC component, but in a processor system which is connected to the IC component via a parallel interface and with which time pattern memories are associated.

An event list generated in the IC component is subsequently immediately transmitted to a time pattern memory of the processor system via the parallel interface so that the IC component is ready to generate the next event list in particular belonging to the radiation pulse transmitted immediately subsequently.

Each memory cell in the time pattern memories provided for the averaging of the individual measurements respectively corresponds to a time window of finite length. The measurement time during which the analog measurement 37 takes place—that is the time which depends on the range of the sensor or on the maximum distance from which the signals are expected—is thus divided into a plurality of sequential time windows of equal length, i.e. work is carried out in accordance with the invention with a time pattern whose pattern corresponds to the division of the time pattern memory. The number of memory cells of the time pattern memory is substantially larger than the number of storage locations of the IC memory since only the relatively small number of expected events is decisive for the dimensioning of the IC memory, but the comparatively large number of time windows is decisive for the time pattern memory.

Each time window and thus each storage location of the time pattern memory corresponds to a counter status of the IC memory containing the up events and the down events and thus the event list so that the content of the IC memory can be mapped unambiguously on the time pattern memory in that the content of the respective memory cell of the time pattern memory is changed by the value 1 for each counter status present in the IC memory, as will be described in more detail in the following.

FIG. 3a shows ten sequentially generated individual measurements, with each individual measurement having been derived via a sequence of logical pulses in accordance with FIG. 2b from an analog measurement 37 in accordance with FIG. 2a which in this case only contains noise, i.e. no signal. Due to the statistical distribution of the noise pulses, the up events and down events of the individual measurements derived from the noise pulses and again shown in FIG. 3a by the upwardly and downwardly projecting needles have a random distribution in time.

The probability that an event occurs in a time window of the measurement time starting with the transmission of a radiation pulse is therefore equally large for all time windows, i.e., when considered over all individual measurements, each time window contains the same number of events or—expressed differently—the needle density is constant in time, with this applying in this precision only to an infinitely large number of averaged individual measurements, that is for an infinitely large averaging depth.

The example of FIG. 3 only has an averaging depth of ten so that the needle density is not exactly constant in time, as FIG. 3b shows.

Depending on the fineness of the time pattern, i.e. in dependence on the size of the time window, it is more or less probable in the case of a finite averaging depth that more than one event falls into a time window. Where this is the case in the example of FIG. 3, this was illustrated in FIG. 3b by needles of twice the normal length.

The averaging of the individual measurements was realized technically in that the individual measurements are introduced sequentially into the same time pattern memory of the processor system. In this process, the ith memory cell of the time pattern memory is changed for an event falling into the ith time window in that the value is increased by 1 in the case of an up event, that is of a rising flank, and is reduced by 1 in the case of a down event, that is in the case of a falling flank.

Consequently, a count is made during the averaging for each time window represented by a memory cell of the time pattern memory of how often an event falls into this time window, with up events being evaluated as positive and down events as negative. If only noise is measured, i.e. if no signal is present, then the occurrence of up events and of down events is equally probable for each time window in the case of an infinitely large averaging depth so that the starting value of each memory cell of the time pattern memory would again be present for this theoretical borderline case at the end of the averaging.

Since each individual measurement in accordance with FIG. 2c represents the time derivation of the underlying logical measurement in accordance with FIG. 2b and only individual measurements are averaged, the averaging explained above takes place so-to-say in the "differentiated world".

The return to the "real world" takes place subsequent to the averaging by integration of the averaged individual measurements (FIG. 3b) to a so-called amplitude function 29 which is shown in FIG. 3c and is also termed the software amplitude or SW amplitude in the following.

In the integration, the sum of the content of all memory cells corresponding to the earlier time windows and of the content of the respective memory cell itself is formed for each time window, that is for each memory cell of the time pattern memory, i.e. the sum of the memory cells 1 to i is written to the ith memory cell. Each addend is only different from zero when the number of the up events which have occurred is different from the number of the down events which have occurred inside the respective time window and the value of an addend different from zero corresponds to the average number of the surplus up events or down events in the respective time window, and indeed to the average number since it is not every individual measurement which is integrated, but the averaged individual measurements, i.e. the integration takes place after the averaging.

A reversal of this order, i.e. an averaging of respectively previously integrated individual measurements would admittedly lead to the same result, since the averaging and the integration are linear calculation operations, but would be associated with a substantially larger calculation effort.

The SW amplitude 29 in accordance with FIG. 3*c* represents the noise of the analog measurement 37 corresponding to FIG. 2*a*, with the noise, however, having been reduced due to the averaging carried out using the individual measurements by a factor depending on the averaging depth that is on the number of the individual measurements used for the averaging. With an infinitely large averaging depth, the SW amplitude 29 in accordance with FIG. 3*c* would be a smooth horizontal line. The noise in the SW amplitude 29 can therefore be termed SW noise.

Only a comparatively low computation effort is required in accordance with the invention for this suppression of the noise since only the characteristic points in time 33 which correspond to the flanks of the logical pulses 23 (FIG. 2*b*) and which form the individual measurements are used as the basis for the averaging, with the averaging additionally only requiring operations comprising the addition and subtraction of the value 1 in the time pattern memory.

The result of the averaging of the plurality of individual measurements shown graphically in FIG. 3*b* can be illustratively termed a packet average value when the plurality of the individual measurements are considered as a packet of individual measurements, i.e. the averaging in accordance with the invention of the individual measurements thus takes place packet-wise. The transition to the amplitude function or to the SW amplitude 29 in accordance with FIG. 3*c* then takes place by integration of the averaged packet of individual measurements or—expressed differently—by integration of the packet average value. The cycle for the further processing of the time pattern memory is hereby reduced overall by the averaging depth.

Figure 4B:
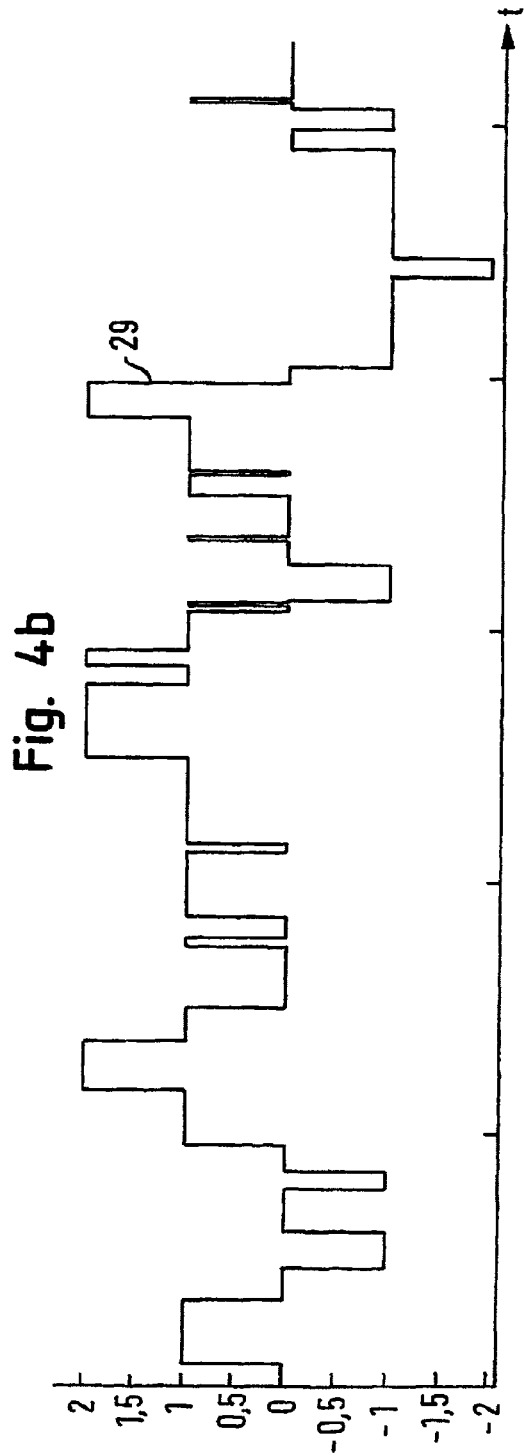

The principle of the integration of averaged individual measurements (FIG. 4*a* to a SW amplitude 29 (FIG. 4*b*) can be seen more clearly from the example of FIG. 4.

The fact that FIG. 4*a* is not an individual measurement, but the result of an averaging of a plurality of individual measurements can already be recognized from the fact that events of the same orientation, i.e. up events or down events, follow directly on one another several times, which is naturally not possible with an individual measurement derived from a real analog measurement since there a down event must follow an up event, and vice versa, as can easily be made clear with the help of FIG. 2.

With the exception of a single time window, each memory cell of the time pattern memory containing the averaging in accordance with FIG. 4*a* has the value 1. The exception is illustrated by a downwardly facing needle with twice the normal length, i.e. precisely two events fell into this time window which consequently occurred at the same point in time within the accuracy of the time pattern, in each case calculated from the transmission of the associated radiation pulse.

For the SW amplitude 29, this means that the sums formed in the integration described above in connection with FIG. 3*b* only do not change by the value 1 one single time between two sequential time windows. This exception is a change by the value 2 which is due to the above-mentioned time window containing two events.

FIG. 5 shows that signals can be detected by means of the method in accordance with the invention which lie in the noise. In particular such signals can be detected whose maximum amplitude is much smaller than 4.5 NEP.

A signal 15 of this type is shown in FIG. 5*a* in the form of a signal pulse 15 without noise having a short period in comparison to the measurement time.

FIG. 5*b* shows an analog measurement 37 corresponding to FIG. 2*a*, with the noise and the signal 15 of FIG. 5*a*, however, being superimposed on one another. This superimposition means that the noise is changed by the signal 15 or—in other words—the signal 15 is contained in the noise. The method in accordance with the invention makes it possible to detect this change in the noise and so the signal 15 even though the signal 15 is deep in the noise and does not project out of the noise.

In this process, the invention utilizes the circumstance that the analog measurement 37 is shifted into the positive with respect to a pure noise measurement in the time range of the signal 15. This shift increases the probability for the fact that the HW threshold 21 is exceeded in the time range of the signal 15 so that there—i.e. in the times windows lying in the time range of the signal 15—in the time average—that is on an averaging of sequential individual measurements—a larger number of up events followed by a larger number of down events takes place than in the exclusively noisy regions without a signal in which the events are statistically distributed.

The averaging depth required for the detection of a signal 15 is dependent inter alia on the level of the signal 15. This is illustrated by FIGS. 5*c*-5*f* which show the SW amplitudes 29 for different averaging depths.

FIG. 5*c* corresponds to an averaging depth of 1, i.e. the SW amplitude 29 shown was obtained by integration of a single individual measurement. For this special case, the SW amplitude 29 is identical to the logical measurement (FIG. 2*b*) at which it would be impossible to recognize a signal.

FIGS. 5*d*, 5*e* and 5*f* show SW amplitudes 29 for averaging depths of 10, 100 and 1,000 respectively. As the averaging depth increases, the signal 15 grows further and further out of the noise. Whereas the signal 15 cannot yet be recognized at an averaging depth of 10 (FIG. 5*d*), the signal 15 is already far above the noise at an averaging depth of 100 (FIG. 5*e*). At an averaging depth of 1,000 (FIG. 5*f*), the noise has already been suppressed so far that the signal 15 can clearly be identified.

For the determination of the distance at which the object 19 is located from which the transmitted radiation pulse 13 was reflected and was received (FIG. 1) as a signal pulse 15 (FIGS. 5*a* and 5*f*), the point in time of the start of the front flank of the signal pulse 15 is required when the distance is calculated while taking account of the speed of light from the time period which passes between the front flank of the transmitted radiation pulse 13 and the front flank of the signal pulse 15.

To determine the point in time forming the end of this time period, a software threshold or SW threshold drawn by way of example in FIG. 5 and also termed a detection threshold 31 in the following is applied to the SW amplitude 29. This detection threshold 31 is a SW threshold 31 in the respect that its application to the SW amplitude 29 takes place within the framework of the software-aided evaluation process running in the microprocessor.

The sought object distance can be calculated using the speed of light from that point in time 65 at which the front flank of the signal pulse 15 passes through the detection threshold 31. Since the determination of this point in time 65 from the point of intersection of the front flank of the signal pulse 15 and the SW threshold 31 takes place by way of software, the point in time 65 is also termed a software event or SW event.

To increase the accuracy of the distance measurement, the circumstance can be utilized within the framework of the software-aided evaluation process that the SS amplitude 29 contains even more information which has remained out of consideration up to now. This will be looked at in more detail in the following.

It is an advantage of the invention that signals 15 as small as desired can be detected since the HW threshold 21 can be placed as far as desired into the noise and can also, for example, lie at 0 NEP. A reduction of the HW threshold 21 only increases the number of the noise pulses obtained from the analog measurement 37 and thus the number of the events 33 per individual measurement derived from the logical pulses 23 of the logical measurement (FIG. 2b), which makes an increase in the averaging depth necessary to suppress the noise so far that the signal 15 in the SW amplitude 29 projects sufficiently far out of the (SW) noise to be able to use the SW threshold 31 (FIG. 5f).

In the consideration of how the SW threshold 31 should be set in dependence on the desired sensitivity increase with respect to the initially explained event measurement so that the signals 15 in the SW amplitude 29 can be separated from the noise with sufficient safety by application of the SW threshold 31, it was found in accordance with the invention based on statistical considerations that a simple setting rule can be recited which reads as follows:

SW threshold=$p \cdot m + 4.5\sqrt{m \cdot p(1-p)}$.

Here:

m: averaging depth on the averaging of the individual measurements p=P(HWs$_{min}$): probability of detecting noise pulses with a HW threshold of HWs$_{min}$ and an averaging depth of m in the SW amplitude, where $$P = 1 - \int_{-\infty}^{S \min} f(x)dx,$$

where f(x)=normal distribution density, S$_{min}$=minimal signal for a measurement defined as "safe", the signal lying at the 9-fold standard deviation, that is at 9 NEP in the case of the event measurement or at 9 σ (σ=standard deviation) with respect to the noise of the SW amplitude in the case of the method in accordance with the invention, and HWs$_{min}$=4.5 NEP/E, where E is the increase in sensitivity required with respect to the event measurement and m=$E^2$ applies.

It is consequently entered into the setting regulation in accordance with the invention for the SW threshold 31 as a definition of "sufficiently safe" that a signal is detected sufficiently safely, i.e. false signals are sufficiently safety avoided, when the signal lies at the 9-fold standard deviation with respect to the noise and according to which the detection of noise is avoided sufficiently safely when the HW threshold amounts to the 4.5-fold of the standard deviation with respect to the noise.

With a required increase in sensitivity with respect to the event measurement of e.g. E=8, a value for the SW threshold of approximately 35 results at an averaging depth of m=$E^2$=64 and the average value of the distribution of the noise in the SW amplitude lies at approximately 18 with a standard deviation of approximately σ=3.62 (18+4.5·3.62≈35). In this process, the value range or result range of the SW threshold is preset by the possible results of the 64 individual measurements from 0 to 64, with still no normalizing of the results range having taken place.

A further advantage of the method in accordance with the invention consists of it being independent of the shape of the signal 15 to be detected. Not only signal pulses 15 which are short in comparison with the measurement time, but also wide signals with an amplitude shaped in any way over its length can be detected by the method in accordance with the invention. A wide signal of this type raises the noise in the respective time range overall in accordance with its amplitude so that the probability for the occurrence of events is increased for each time window with respect to a purely noise measurement. The SW amplitude is then a more or less smooth function in this time range in dependence on the averaging depth and is shifted upwardly by a degree corresponding to the amplitude of the wide signal with respect to the position of an SW amplitude representing pure noise.

It is furthermore of advantage in accordance with the invention for any desired number of signals occurring sequentially during the measurement time to be able to be detected. Every change in the noise caused by a signal results in a signal 15 in the SW amplitude 29 which can be detected by means of the SW threshold 31, as can be seen directly from FIG. 5. The method in accordance with the invention therefore automatically has multi-echo capability.

As already mentioned in the introductory part, the bandwidth of the amplitude function 29 can be reduced in that a smoothing is carried out by horizontal averaging, e.g. in that averaging is carried out in the amplitude function 29 in each case over a predetermined number of sequential time windows. A smoothing of this type has not yet been carried out in each case in the amplitude functions 29 shown in FIGS. 5c-5f. The SW noise still remaining after the averaging can be reduced even further with respect to the signal 15 by the smoothing. A further increase of the sensitivity can hereby be achieved since only the noise is smoothed, whereas the signal—to the extent it is wider than the smoothing time—remains unchanged with respect to the level.

As already explained above, the accuracy of the distance measurement can furthermore be improved, starting from the amplitude function 29 by a further measure which can be carried out by way of software and which is termed noise compensation in that not the SW event 65, that is not the point of intersection of the front or rising flank of the signal pulse 15 with the SW threshold 31 (FIG. 5f), is used as the basis for the propagation time measurement relating to the signal pulse 15. An extrapolation of the noise is rather carried out in the noise compensation in the region of the SW event 65, whereby a noise function is obtained which is subsequently locally deducted from the amplitude function 29 in the region of the front flank. In the amplitude function 29 cleaned of noise in this manner in the region of the signal pulse 15, it is now possible by extrapolation of the front or rising flank of the signal pulse 15 to determine its point of intersection with the zero line, that is with the average value of the noise. This point of intersection then serves as that significant nadir on whose basis the object distance is calculated. This noise compensation can also be carried out at the rear or falling flank of the signal pulse 15.

The distance calculation takes place in that that time period is measured which passes from the transmission of the respective radiation pulse 13 (FIG. 1), in particular from its front flank, up to the above-mentioned significant nadir, with the number of the clock pulses or cycle pulses emitted by the central measuring clock 43 (FIG. 1) being counted using a counter for this purpose. The time period which has passed between the transmitted radiation pulse 13 and the received signal pulse 15 can then be determined from the known width and frequency of these cycle pulses and the corresponding object distance can be calculated utilizing the speed of light.

The following is provided in a possible configuration of a sensor in accordance with the invention named only as an example at this point and with which the measuring method in accordance with the invention can be carried out.

The sensor in accordance with the invention has a reception channel. A pulse laser diode with a wavelength of the emitted light of 905 nm is used as the transmitter of the electromagnetic radiation. The pulse width of the transmitted radiation pulses amounts to approx. 5 ns. The power amounts to 40 W. An APD with the factor 80 is used as the reception diode. A broadband amplifier with a capacitive coupling is used as an amplifier.

The pulse repetition rate is 10 kHz so that the time between two directly sequential transmitted radiation pulses amounts to 0.1 ms.

Approximately 82 m would result as the range with the initially explained event measurement using the above configuration and with a diameter of the converging optical system of 50 mm and a reflectivity of the target object whose distance should be measured of approximately 5% while taking into account typical sunlight and typical atmospheric damping.

If the sensitivity should e.g. be increased by the value 8, 64 individual measurements must be averaged to one measurement. A signal of 9 NEP is assumed as the minimum signal for a safe detection. The associated HW threshold would have to be reduced from 4.5 NEP to approximately 0.56 NEP to be able to safely detect the 8-fold smaller signal after the averaging. At 0.56 NEP, the probability of detecting a noise pulse is approximately 0.287 with respect to 0.5 at 0 NEP. If one takes these values into the corresponding binominal distributions, there results for the SW amplitude $\sigma$=3.62. The value range for the SW amplitude in this process is 0 to 64, and indeed in line with the possible results at 64 events. The average value lies at 18.37. To now achieve a safe measurement in the software range, i.e. in the SW amplitude, the SW threshold must be set to 35, as was already shown above.

A range of approximately 220 m would be achieved with this design of a sensor, since an increase in sensitivity by the factor E only enters into the increase in the range with the factor $\sqrt{E}$ and reductions due to other effects occurring in practice, e.g. atmospheric damping, were taken into account.

An average of approximately 100 noise pulses with an average width of approximately 6 ns would be detected on this path of 220 m when the receiver has a bandwidth of approximately 200 MHz and a low pass of the 3rd order.

Each individual measurement would therefore consist of approximately 100 up events and 100 down events which are stored in the IC memory as an event list. 200 times 2 bytes would be sufficient as the memory size since the largest number to be stored would fit into 2 bytes. A memory of the size of 400 bytes would therefore be sufficient in the IC component.

The SW amplitude arises by integration of the averaged individual measurement which consists of approximately 12,800 events overall. If a counter with a count frequency of 1.5 GHz is used, a time window in the time pattern thus represents a distance difference of 0.1 m. For a distance of 220 m, 2,200 time pattern positions, that is memory cells in the time pattern memory, would be required so that each time pattern position would be filled with approximately 2.9 times "+1" and 2.9 times "−1" on average. The statistical fluctuation of this filling produces the actual filling number. The required memory size amounts to 2,200 bytes.

64 *0.1 ms=6.4 ms results as the measurement time, whereby a measuring rate of 156 Hz can be represented.

The sensor in accordance with the invention working in accordance with the method in accordance with the invention copes with the measurement of this amount of pulses consisting of approximately 100 noise and signal pulses and processes the results into distances, with an increase of sensitivity of 8 and an increase of range of approximately $\sqrt{8}$=2.8 being achieved with respect to the event measurement.

Above all the dramatic increase in sensitivity, but also the practically unlimited multi-echo capability as well as the possibility of the pulse shape analysis of pulses which are deformed in dependence on the configuration of the target object and which are made available by the invention open up an abundance of new application possibilities which were previously not realizable.

The optical performance can thus be reduced e.g. due to the higher sensitivity on the transmitter side without losses in sensitivity in that an LED is used as the transmitter element instead of a laser diode. Alternatively, a CW laser diode in pulsed operation can be used as the transmitter element which can be designed for the transmission of electromagnetic radiation lying in the range visible to the human eye. These measures can result in a substantial reduction in costs in the manufacture of the sensor.

An alternatively or additionally possible measure with which the manufacturing costs can likewise be reduced consists of the use on the receiver side of PIN diodes as receiver elements which can be used instead of diodes of the APD type.

Sensors with a reduced power consumption can furthermore be realized. The invention in particular permits the manufacture of sensors which manage with a comparatively low operating voltage of e.g. 5 V.

A further possibility to use the increase in sensitivity achievable with the invention in an advantageous manner consists of making the optical devices of the sensor smaller in that e.g. the optical surfaces on the receiver side are reduced. In this manner, the increase in sensitivity gained by the invention is utilized to make the sensor smaller, with the original performance of the sensor based on optical devices in a normal size being maintained.

Whereas measures of this type—to the degree that they can be realized at all—would have the consequence of at least a dramatic reduction in range with conventional sensors, the range is not impaired when these measures take place in connection with the invention, since the losses in the range resulting from these measures can at least be compensated by the increase in sensitivity achievable in accordance with the invention.

Furthermore, specific applications of distance measurement only become possible at all or can at least be carried out substantially more easily by the invention.

For example, distance measurements with a polluted atmosphere or with contaminated optical surfaces of the sensor must be mentioned here. A pollution of the atmosphere can take place e.g. by fog. A sensor in accordance with the invention can serve as a fog detector since fog is not only detectable at all due to the high sensitivity and to the unlimited multi-echo capability as well as to the possibility of pulse shape analysis, but also those pulse shapes can be recognized which are characteristic for fog due to the possibility in accordance with the invention for the evaluation of the shape of the signal pulses received.

The invention can furthermore generally also be used in connection with scanners, i.e. at scanners with which respective radiation pulses are transmitted sequentially at different angular directions in one or more scanning planes and the reflected signal pulses are evaluated for each transmitted radiation pulse with respect to their propagation time and to their angular direction. The lower the scanning frequency, i.e. the more slowly the respective components of a sensor making use of the invention turn, the larger the averaging depth can be selected since then the scanner "looks" the longer in at least approximately the same direction and thus can "target" the same object.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method of distance measurement, comprising:
   transmitting pulsed electromagnetic radiation (13) using at least one transmitter (11);
   detecting reflected signal pulses (15) using at least one receiver (17);
   measuring distances from objects (19) at which the transmitted radiation pulses (13) are reflected by determining a pulse propagation time;
   measuring noise using the receiver (17) with specific points in time (33) being determined at which at least one threshold (21) of the receiver (17) lying in the noise is passed through and with changes in the noise caused by the signal pulses (15) being detected by averaging a plurality of individual measurements respectively including the specific points in time (33);
   wherein a sequence of logical pulses (23) is generated by means of the threshold (21) of the receiver (17) lying in the noise from the analog received signal (37) containing the noise pulses and/or noise pulses changed by the signal pulses (15), with the individual measurement being derived from this sequence;
   wherein the flanks of the logical pulses (23) are used as points in time (33) of the individual measurement;
   wherein a distinction is made in the averaging between points in time (33) at which the threshold (21) of the receiver (17) is exceeded and points in time (33) at which the threshold (21) of the receiver (17) is fallen below, with a point in time (33) of an exceeding being evaluated as positive and a point in time (33) of a falling below being evaluated negatively;
   wherein the average value is integrated into an amplitude function (29) subsequent to the averaging of the individual measurements;
   wherein a detection threshold (31) is applied to the amplitude function (29) for the detection of the changes in the noise caused by the signal pulses (15); and
   wherein the respective associated object distance is determined in the amplitude function (29) for the signal pulses (15) on the basis of at least one point in time (65) at which the detection threshold (31) is passed through.

2. A method in accordance with claim 1, wherein an individual measurement is generated for each transmitted radiation pulse (13).

3. A method in accordance with claim 1, wherein generating and averaging of the individual measurements and the detection of the changes in the noise take place by means of a software-aided evaluation method.

4. A method in accordance with claim 1, wherein the points in time (33) of the individual measurement are introduced into at least one memory (25, 27).

5. A method in accordance with claim 1, wherein the points in time (33) of the individual measurement are first intermediately stored in a memory (25), in particular in a memory of an IC component (45), and are subsequently transferred to a further memory (27), in particular to a time pattern memory, with the points in time (33) being stored in the further memory (27) in an arrangement taking their respective time information into account.

6. A method in accordance with claim 1, wherein the averaging of the individual measurements is carried out in at least one time pattern memory (27), with the same time pattern memory (27) preferably being used for all individual measurements to be averaged and with the corresponding memory cell of the time pattern memory (27) being increased by a value n in the case of a rising pulse flank and being reduced by the value n in the case of a falling flank, or vice versa, with the value 1 being used for n.

7. A method in accordance with claim 1, wherein a time pattern is used in the averaging of the individual measurements in which the measurement time is divided into a plurality of sequential time windows, with one memory cell of at least one time pattern memory (25, 27) being associated with each time window.

8. A method in accordance with claim 7, wherein the number of passing throughs of the threshold (21) of the receiver (17) is counted or averaged, in particular with the correct sign, for each time window in the averaging.

9. A method in accordance with claim 1, wherein the bandwidth of the amplitude function (29) is reduced in that averaging is preferably carried out in the amplitude function (29) in each case over a predetermined number of sequential time windows.

10. A method in accordance with claim 1, wherein the detection threshold (31) is set in dependence on a factor by which the threshold (21) of the receiver (17) is reduced with respect to a value of 4.5 NEP.

11. A method in accordance with claim 10, wherein the detection threshold (31) is calculated from a calculation specification containing the factor.

12. A method in accordance with claim 1, wherein, in the amplitude function (29) for the determination of nadirs of the signal pulses (15), in each case in the region of the rising flank and/or falling flank of the signal pulse (15), an extrapolation of the noise is carried out, a noise function obtained in this process is deducted from the amplitude function (29) and the point of intersection of the interpolated pulse flank with the average value of the noise is determined as the nadir, with the object distances being determined on the basis of the nadirs.

13. A method in accordance with claim 1, wherein a shape of the signal pulses (15) is evaluated in the amplitude function (29).

14. A method in accordance with claim 1, wherein the averaging of the individual measurements takes place packet-wise in that a summing is carried out sequentially in each case via a number of single individual measurements and a division is made by the number of individual measurements for the formation of packet average values.

15. A method in accordance with claim 14, wherein the object distances are determined from a single packet average value.

16. A method in accordance with claim 14, wherein averaging is carried out over a plurality of packets and the object distances are determined from the average value hereby formed.

17. A method of distance measurement, comprising:
transmitting pulsed electromagnetic radiation (13) using at least one transmitter (11);
detecting reflected signal pulses (15) using at least one receiver (17);
measuring distances from objects (19) at which the transmitted radiation pulses (13) are reflected by determining a pulse propagation time;
measuring noise using the receiver (17) with specific points in time (33) being determined at which at least one threshold (21) of the receiver (17) lying in the noise is passed through and with changes in the noise caused by the signal pulses (15) being detected by averaging a plurality of individual measurements respectively including the specific points in time (33);
wherein a sequence of logical pulses (23) is generated by means of the threshold (21) of the receiver (17) lying in the noise from the analog received signal (37) containing the noise pulses and/or noise pulses changed by the signal pulses (15), with the individual measurement being derived from this sequence;
wherein the flanks of the logical pulses (23) are used as points in time (33) of the individual measurement;
wherein a distinction is made in the averaging between points in time (33) at which the threshold (21) of the receiver (17) is exceeded and points in time (33) at which the threshold (21) of the receiver (17) is fallen below, with a point in time (33) of an exceeding being evaluated as negative and a point in time (33) of a falling below being evaluated positively;
wherein the average value is integrated into an amplitude function (29) subsequent to the averaging of the individual measurements;
wherein a detection threshold (31) is applied to the amplitude function (29) for the detection of the changes in the noise caused by the signal pulses (15); and
wherein the respective associated object distance is determined in the amplitude function (29) for the signal pulses (15) on the basis of at least one point in time (65) at which the detection threshold (31) is passed through.

18. An apparatus for distance measurement, comprising:
means for transmitting pulsed electromagnetic radiation (13) using at least one transmitter (11);
means for detecting reflected signal pulses (15) using at least one receiver (17);
means for measuring distances from objects (19) at which the transmitted radiation pulses (13) are reflected by determining a pulse propagation time;
means for measuring noise using the receiver (17) with specific points in time (33) being determined at which at least one threshold (21) of the receiver (17) lying in the noise is passed through and with changes in the noise caused by the signal pulses (15) being detected by averaging a plurality of individual measurements respectively including the specific points in time (33);
wherein a sequence of logical pulses (23) is generated by means of the threshold (21) of the receiver (17) lying in the noise from the analog received signal (37) containing the noise pulses and/or noise pulses changed by the signal pulses (15), with the individual measurement being derived from this sequence;
wherein the flanks of the logical pulses (23) are used as points in time (33) of the individual measurement;
wherein a distinction is made in the averaging between points in time (33) at which the threshold (21) of the receiver (17) is exceeded and points in time (33) at which the threshold (21) of the receiver (17) is fallen below, with a point in time (33) of an exceeding being evaluated as positive and a point in time (33) of a falling below being evaluated negatively;
wherein the average value is integrated into an amplitude function (29) subsequent to the averaging of the individual measurements;
wherein a detection threshold (31) is applied to the amplitude function (29) for the detection of the changes in the noise caused by the signal pulses (15); and
wherein the respective associated object distance is determined in the amplitude function (29) for the signal pulses (15) on the basis of at least one point in time (65) at which the detection threshold (31) is passed through.

19. An apparatus in accordance with claim 18, wherein the means for measuring noise with the threshold (21) lying in the noise comprises at least one comparator (39) or at least one limiting amplifier.

20. An apparatus in accordance with claim 18, wherein a clock (43) for the emission of cycle pulses of a known width with a known frequency and a counter with which the cycle pulses emitted during a time period are provided for the determination of time periods which respectively pass from the transmission of a radiation pulse (13) up to a point in time (33) corresponding to a flank of a logical pulse (23).

21. An apparatus in accordance with claim 18, wherein the measurement time is divided into a plurality of sequential time windows and the evaluation device (41) comprises at least one time pattern memory (27) whose memory cells are each associated with a time window.

22. An apparatus in accordance with claim 21, wherein the value of each memory cell is changeable by a pulse flank falling into the corresponding time window, with each memory cell preferably being able to be increased by a rising pulse flank by a value n and, in the case of a falling flank, being able to be reduced by the value n, or vice versa, with the value 1 being used for n.

23. An apparatus in accordance with claim 18, wherein the generation and the averaging of the individual measurements as well as the detection of the changes in the noise can be carried out by means of a software-aided evaluation method.

24. An apparatus in accordance with claim 18, wherein the evaluation device (41) comprises at least one IC component (45) in which at least the generation of the individual measurements can be carried out.

25. An apparatus in accordance with claim 24, wherein the evaluation unit (41) comprises at least one microprocessor (47) and at least one interface (49) for the transmission of the generated individual measurements from the IC component (45) into the microprocessor (47), with at least the averaging of the individual measurements and the detection of the changes in the noise being able to be carried out by means of the microprocessor (47) and of at least one memory (27).

26. An apparatus for distance measurement, comprising:
means for transmitting pulsed electromagnetic radiation (13) using at least one transmitter (11);
means for detecting reflected signal pulses (15) using at least one receiver (17);
means for measuring distances from objects (19) at which the transmitted radiation pulses (13) are reflected by determining a pulse propagation time;
means for measuring noise using the receiver (17) with specific points in time (33) being determined at which at least one threshold (21) of the receiver (17) lying in the noise is passed through and with changes in the noise caused by the signal pulses (15) being detected by averaging a plurality of individual measurements respectively including the specific points in time (33);

wherein a sequence of logical pulses (23) is generated by means of the threshold (21) of the receiver (17) lying in the noise from the analog received signal (37) containing the noise pulses and/or noise pulses changed by the signal pulses (15), with the individual measurement being derived from this sequence;

wherein the flanks of the logical pulses (23) are used as points in time (33) of the individual measurement;

wherein a distinction is made in the averaging between points in time (33) at which the threshold (21) of the receiver (17) is exceeded and points in time (33) at which the threshold (21) of the receiver (17) is fallen below, with a point in time (33) of an exceeding being evaluated as negative and a point in time (33) of a falling below being evaluated positively;

wherein the average value is integrated into an amplitude function (29) subsequent to the averaging of the individual measurements;

wherein a detection threshold (31) is applied to the amplitude function (29) for the detection of the changes in the noise caused by the signal pulses (15); and wherein the respective associated object distance is determined in the amplitude function (29) for the signal pulses (15) on the basis of at least one point in time (65) at which the detection threshold (31) is passed through.

\* \* \* \* \*